United States Patent [19]

Van Delft et al.

[11] 4,076,852

[45] * Feb. 28, 1978

[54] EDIBLE COMPOSITIONS HAVING A MEAT FLAVOR AND PROCESSES FOR MAKING SAME

[75] Inventors: Andries Van Delft, Nieuw Loosdrecht, Netherlands; Christopher Giacino, Califon, N.J.

[73] Assignee: International Flavors & Fragrances Inc., New York, N.Y.

[*] Notice: The portion of the term of this patent subsequent to Jan. 21, 1992, has been disclaimed.

[21] Appl. No.: 451,470

[22] Filed: Mar. 15, 1974

Related U.S. Application Data

[63] Continuation-in-part of Ser. No. 334,894, Feb. 22, 1973, abandoned.

[51] Int. Cl.$^2$ .............................................. A23L 1/227
[52] U.S. Cl. ..................................... 426/533; 426/47; 426/656
[58] Field of Search ................. 426/65, 175, 211, 212, 426/348, 364, 371, 533, 656, 47, 614

[56] References Cited

U.S. PATENT DOCUMENTS

| | | | |
|---|---|---|---|
| 3,394,015 | 7/1968 | Giacino | 426/65 |
| 3,862,343 | 1/1975 | Breukink et al. | 426/211 |
| 3,865,958 | 2/1975 | Breukink et al. | 426/212 X |

FOREIGN PATENT DOCUMENTS 704,725   7/1970   South Africa.

*Primary Examiner*—Raymond M. Jones
*Assistant Examiner*—Esther M. Kepplinger
*Attorney, Agent, or Firm*—Arthur L. Liberman; Harold Haidt; Franklin D. Wolffe

[57] ABSTRACT

Processes for imparting a meat flavor to foodstuffs comprising adding thereto a small amount of a processed product of (I) the whole internal contents of a poultry egg or egg white or egg yolk or enzymatic digest of same, with (II) a poultry meat or other meat powder or enzymatic digest thereof and, in addition, (III) a sulfur compound such as cysteine or taurine and, if desired, (preferably) (IV) thiamine and/or thiazole alkanols and (V) other free amino acids and/or polypeptides and, in addition, if desired, a monosaccharide and/or a disaccharide, such as sucrose and/or a polysaccharide; as well as flavoring compositions and flavor enhancing compositions containing such processed products and optional materials and the foodstuffs so obtained.

4 Claims, No Drawings

EDIBLE COMPOSITIONS HAVING A MEAT FLAVOR AND PROCESSES FOR MAKING SAME

This application is a continuation in part of U.S. patent application Ser. No. 334,894, filed on Feb. 22, 1973 now abandoned.

BACKGROUND OF THE INVENTION

This invention relates to flavoring foodstuffs, to compositions of flavoring foodstuffs, and to the products so obtained.

Much attention has been devoted to improving the flavor of foodstuffs and particularly the flavors of meat products, fruits and confectioneries. There is also a need to provide compositions and processes for improving the flavors of meat products such as patties containing chicken meat or duck meat or turkey meat, or for providing savory meat flavors to foods containing a low level of poultry meat or to meat products having only a low level of flavor.

A substantial number of investigations have been carried out relating to reacting such materials as amino acids, hydrolyzed vegetable proteins, sugars, sulfur-containing compounds (e.g., cysteine and hydrogen sulfide) and ribonucleotides in an effort to produce meaty tasting products including poultry meat tasting products, or ingredients therefor. Thus, for example, the following publications set forth such reaction products and methods for preparing same:

| | Publication | Reactants |
|---|---|---|
| (1) | U.S. Pat. No. 3,394,017 | Poultry meat flavor produced by reacting thiamine and a mixture of amino acids |
| (2) | U.S. Pat. No. 3,519,437 | Poultry flavor produced by reacting thiamine and 2-aminoethane sulfonic acid |
| (3) | South African published Patent Application 70/4725 | A saccharide, an amino acid and an egg component which can be either egg white, egg yolk, or the contents of whole egg. |
| (4) | U.S. Pat. No. 3,532,514 | Cysteine, sugar, fatty acid material. |
| (5) | Belgian Patent 740,221 | Reducing sugar and fish product extract. |
| (6) | U.S. Pat. No. 3,394,015 | Sulfur-containing compound and hydrolyzed vegetable protein (sugar-free) |
| (7) | U.S. Pat. No. 3,394,016 | Thiamine and an aliphatic carboxylic acid |
| (8) | German Offen. 1,932,800 | Hydrogen sulfide and a 4-hydroxy-2,3-dihydrofuran-3-one |
| (9) | U.S. Pat. No. 2,918,376 | Fish protein hydrolyzate and cysteine |
| (10) | U.S. Pat. No. 2,887,387 | Fish protein hydrolyzate and saccharide |
| (11) | Copending U.S. Patent Application 343,360 filed March 19, 1973 | Meat flavor produced by the heat reaction (in the absence of any egg components) of an enzymatic digest of meat including poultry meat and a sulfur compound such as cysteine and, optionally, thiamine. |

Still other publications set forth the use of eggs themselves as food ingredients. Two of these publications are as follows:

Canadian Pat. No. 898,055
Canadian Pat. No. 898,056

However, none of the foregoing references, disclosing processed food flavoring materials, discloses the production of a natural meat-flavored material from reactants having low meat levels and wherein one of the reactants is egg yolk, egg white, or the internal contents of an entire poultry egg, or enzymatic digest thereof, another of the reactants is a poultry meat powder or a meat powder other than poultry meat or enzymatic digest thereof and still another of the key reactants is a sulfur-containing compound. Although the abovementioned South African Patent Application No. 70/4725 describes reaction products wherein one reactant is the contents of an egg and another reactant is a mixture of amino acids, e.g., hydrolyzed vegetable protein, the reaction product disclosed is merely a meat extract flavor rather than a full bodied meaty flavor with substantially authentic mouthfeel and, no sulfur-containing compound is set forth as one of the reactants. In addition, thiamine or a salt thereof or a precursor thereof is not included as one of the reactants.

U.S. patent applications Ser. Nos. 304,805 now U.S. Pat. No. 3,865,958 and 304,806 now U.S. Pat. No. 3,862,343 filed on Nov. 8, 1972 disclosed a reaction product wherein all of the above-named reactants are used to form such reaction product except meat powder or an enzymatic digest thereof is not disclosed as one of the reactants. The omission of such material in the said earlier-filed copending patent applications gives rise to reaction products which are different in kind from those which represent our invention as set forth herein.

Copending U.S. application Ser. No. 342,360 cited above also contains disclosure of processes which give rise to reaction products which are different in kind from those which represent our invention as set forth herein.

| "ADDITIONAL PERTINENT REFERENCES | | |
|---|---|---|
| 1) | FID Handbook (Formulas and Product Specifications) Published by the Food Ingredients Division of the Nestle Company in White Plains, New York, 10605 (1967); pages of Interest: | |
| | Introduction | |
| | Page SPH-1 | Page SPH-3 |
| | SPH-1A | SPH-21 |
| | SPH-1B | SPY1-1 |
| | SPH-1C | SPY1-2 |
| | SPH-2 | SPY-3 |
| | SPH-2A | SPY-4 |
| | SPH-2B | |
| 2) | CPC French Patent 2,181,585, Published December 7, 1973 | |

THE INVENTION

This invention relates to novel meat and poultry meat flavoring compositions and to processes for preparing them.

Food products enhanced with meat-like (including poultry meat-like) flavorings are well known and have long been used.

As used herein, the term "meat" is intended to include animal protein such as beef, veal, pork, lamb, chicken, turkey, duck, and goose. Thus, the term "meat-like" is intended to be all inclusive and, of course, is intended to include the term "poultry meat-like."

There is considerable demand for meat flavored products wherein there is little if any actual beef, veal, pork, lamb or poultry meat and where larger quantities of such meats are either unnecessary or are actually undesirable. Thus, for example, in the preparation of sauces, gravies and purees the beef, veal, pork, lamb or poultry flavor is desired, but it is necessary to cook with the desired meat and then remove said meat by straining or using some similar operation to obtain the final product ready for use.

Additionally, where weight, space and/or storage capacity are problems, e.g. when a convenience food is prepared, the presence of relatively large quantities of the actual meat may be undesirable because of deterioration problems in storage. Moreover, there are occasions when sterilizing or otherwise preserving relatively larger concentrations of the natural product is extremely deleterious to the flavor of the natural materials and the desired natural flavor is lost.

U.S. Pat. Nos. 3,394,015; 3,394,016; 3,394,017 and 3,519,437 as well as U.S. patent applications Ser. Nos. 304,805 and 304,806 filed on Nov. 8, 1972 and patent application Ser. No. 362,360 filed Mar. 19, 1973 in part, provide solutions to the aforementioned problems by providing methods for the production of poultry and other meat flavors which contain a substantial number of the notes of natural poultry and other meat flavors but which do not contain any actual meat products. However, these several patents and Patent applications do not teach techniques for producing highly intensified, controlled meat flavors having mouthfeel and flavor nuances closely resembling those properties attributable to the actual natural meat flavors. Furthermore, the above-mentioned patents and copending patent applications do not disclose my highly refined technique for reproducibly duplicating in a highly intense form a specific desired meat flavor, (1) without including very substantial quantities of the actual meat, (the flavor of which is desired to be duplicated) in the initial reaction mass, and still (2) providing such highly intensified controlled meat or poultry flavors having mouthfeel and flavor nuances closely duplicating those of the said desired natural flavor. The term "controlled" is intended to mean the determination, in advance, of the specific quality of the flavor desired to be produced, (e.g. "reacted beef", "veal", "pork", "lamb", "duck meat", "white turkey meat", and "chicken meat") by using the appropriate reactants in the proper proportion.

Although the aforementioned publications and patent applications give rise to general meat flavor applications, the high degree of control of quality taken together with the high intensity and an ability to duplicate mouthfeel and substantially all of the flavor nuances of the various meat flavors was not taught therein.

Accordingly, this invention provides specific reproducible controlled beef, veal, pork, lamb and poultry flavors as desired, not only insofar as their flavor nuances are concerned but also insofar as the mouthfeel of such flavors are concerned.

This invention also provides essentially natural-like particularly controlled meat flavored products which are suitable for incorporation into a wide range of foodstuffs.

Further and more specific objects, features and advantages will clearly appear from the detailed description below taken in conjunction with the accompanying examples which illustrate certain preferred embodiments of this invention.

In one aspect of this invention, an edible flavor composition is produced by heating a reaction mixture of (i) a poultry egg yolk or poultry egg white or the entire internal contents of a poultry egg or an enzymatic digest of one of the three aforementioned materials with (ii) a meat powder such as turkey meat powder or an enzymatic digest thereof and (iii) a sulfur-containing compound whereby a reaction product is produced. This heating is carried out for a period of time sufficient to develop a flavor of beef, veal, pork, lamb or poultry in the mixture. Depending on (i) the particular nature of the egg or enzymatic digest thereof and, in addition, (ii) the particular nature of the powdered meat or enzymatic digest thereof used, the resulting meaty flavor will be the flavor of either the meat of the species which provides the egg or of the powdered meat used, depending on the relative ratio of the two particular products used. Thus, for example where the ratio of the egg product to the powdered meat material is greater than 3:1 and the egg product is the egg yolk of duck egg, the resulting flavor will be that of duck meat so long as the meat powder is a poultry meat powder used. If the meat powder used is different in kind rather than degree of quality from the nature of the egg used the resulting flavor will not be particularly recognizable although it will be quite palatable.

Furthermore, where the ratio of meat powder to egg product or enzymatic digest of same is greater than 1:1 the resulting flavor will have a quality closely resembling that of the original meat powder notwithstanding the fact that the preponderance (by weight) of the reactants are not proteinacious.

The edible reaction products produced by the process of our invention are novel meat flavoring materials or bases. Accordingly, edible compositions having enhanced flavor and which comprises a food and the aforesaid reaction product are further contemplated by our invention. In addition, other reactants are used to modify or augment the particular meat flavor without changing, in kind, the resulting specific meat flavor produced. Thus, for example, acid salts of thiamine in the reaction mixture will give rise to a more natural intense meaty flavor but will not bring about a change in the specific nature of the meat flavor produced. Other materials that can be added in addition to or in lieu of thiamine are thiazole alkanols (which are, for example, thiamine precursors) such as those described in U.S. Pat. No. 3,681,088 issued on Aug. 1, 1972 and other free amino acids and polypeptides.

Our invention in its broad aspect also involves heating a mixture which comprises an enzymatic digest of a poultry egg yolk or the enzymatic digest of a poultry egg white or an enzymatic digest of the entire contents of a poultry egg together with an enzymatic digest of a meat and, in addition, a sulfur-containing compound at an elevated temperature for a period of time whereby a specific meat flavor is developed. It is to be noted the pre-mix per se possesses very little of meat characteristics and hence our invention may be regarded as being in the discovery that when a small amount of meat powder or enzymatic digest thereof is used in conjunction with at least one of the components of the contents of a particular poultry egg or enzymatic digest thereof, the result will be the imparting of a specific meat flavor nuance to a reaction flavor of this component and optionally but preferably, thiamine or a thiamine salt or a precursor therefor as defined infra.

The term "poultry egg" is herein intended to mean a non-fertilized chicken egg, duck egg, turkey egg, squab egg, goose egg, quail egg and pheasant egg and the like, in their natural states or in their dried forms (e.g. freeze-dried eggs) or defated egg yolks or in the form of solutions of said dried forms of poultry eggs.

The enzymatic digest of meat such as enzymatic digest of turkey meat is produced by admixing said meat, preferably in the form of a powder in aqueous media with an enzyme which has the ability to effect selective cleavage of the peptide bonds located in the molecular structure of the meat protein. The enzyme used in digesting the egg protein are the same as those enzymes used in digesting the meat protein. Examples of such enzymes are as follows:

(1) Papain
(2) Pilzprotease S (produced by Roehm G.m.g.H., Darmstadt Germany)
(3) Phozyme P 11 (produced by Rohm & Haas G.m.b.H., Darmstadt Germany)
(4) Bromelin
(5) Pepsin
(6) Trypsin
(7) J-25 (Produced by Rohm & Haas Inc. of Philadelphia, Pa.)
(8) Protease 62 (produced by Rohm & Haas Inc. of Philadelphia, Pa.)
(9) HT Proteolytic 200 (produced by Marschall Division of Miles Laboratories Inc. Elkhart, Indiana)
(10) Fungal Protease (produced by Marschall Division of Miles Laboratories Inc. Elkhart, Indiana)
(11) Prolase MT-7820 (produced by Wallerstein Laboratories of Martin Grove, Illinois)
(12) Molsin (produced by Seishin Pharmaceuticals Ltd. Noda Shiba, Japan)
(13) Mylase
(14) Bakterien Protease N (produced by Roehm G.m.b.H., Darmstadt (Germany)
(15) Protease enzymes produced according to the processes set forth in German Offen. No. 2063988, published on July 28, 1972 and assigned to Henkel & Cie GmbH.

Of all of the above mentioned enzymes, the most preferred for the purpose of digesting egg protein from both a commercial standpoint and an organoleptic standpoint for the purpose of this invention is papain. The most preferred for digesting meat protein from both a commercial standpoint and organoleptic standpoint for the purpose of this invention is pepsin.

Furthermore, when producing the enzymatic digest of the above mentioned meat protein material, it is preferred to admix the enzyme with the meat material at a temperature of from 40° up to 75° in aqueous media for a period of time from 10 hours up to 150 hours. Periods of time greater than 200 hours and/or temperatures higher than 75° C will give rise to a product which is less desirable for the purpose of subsequent reaction with the sulfur-containing compound. On the other hand, temperatures below 40° C and/or times of mixing below 10 hours will give rise to only a partially enzymatically digested meat product which would not give rise to an ultimate reaction product having the desired predictable and intense flavor nuances, mouthfeel and texture properties. Furthermore, in producing the above mentioned enzymatic digest, it is important that proper pH adjustments be made on the enzyme-protein material-water mix, prior to incubation. Suitable pH ranges vary from 3 up to 6 and constant pH's are obtainable by using appropriate buffers, e.g. sodium citrate and sodium diacid phosphate of pH of 4.6.

The term "sulfur-containing compounds" is intended to mean sulfur-containing amino acids which have the ability to liberate hydrogen sulfide when reacted, or lower alkyl mercaptans, or lower alkyl sulfides, or lower alkyl disulfides, or amino alkane sulfonic acids or salts thereof, e.g. the sodium salt of amino ethane sulfonic acid (taurine). The term "sulfur-containing compounds" may also include an inorganic sulfur compound or hydrogen sulfide itself, each of which is adapted to liberate a flavor under heating. Such inorganic sulfur compounds are designated herein as having the formula $MS_x$, wherein M is selected from the group consisting of an alkali metal (e.g. sodium or potassium), an alkaline earth metal (e.g. calcium or magnesium) and ammonium and $S_x$ is selected from the group consisting of sulfide, polysulfide and sulfhydrate.

When hydrogen sulfide or a lower alkyl mercaptan is used, it is necessary to control the amount used so as to avoid over-powering the aroma of the product with the aroma of the mercaptan or the hydrogen sulfide. The lower alkyl mercaptans and sulfides preferably contain from 1 up to 6 carbon atoms. The lower alkyl disulfides preferably contain 1 to 3 carbon atoms. Cysteine and methionine and their acid salts, such as cysteine hydrochloride, are especially preferred sulfur-containing amino acids. Especially preferred products resembling natural flavor and having the natural texture and mouthfeel attributable to such natural flavor are produced by means of first producing a papain enzymatic digest of a poultry egg yolk and powdered meat (such as chicken meat), the weight ratio of the enzymatic digest of egg to powdered meat being approximately 2:1 and then heating the mixture of such enzymatic digest and powdered meat with cysteine hydrochloride.

Cysteine and cystine are sulfur-containing amino acids readily available as free amino acids or as salts, both acidic and basic. Preferably, the acid sales, especially the halogen acid salts, such as the hydrochloride, are utilized. The inorganic sulfur-containing compounds mentioned above include sodium sulfhydrate and sodium sulfide. Instead of sodium compounds, corresponding compounds of potassium, calcium and ammonium or substituted ammonium may be used. Any such compound employed must be capable of reacting to give the desired specific natural meat note.

Other organic sulfur-containing compounds useful in the practice of our invention include methyl mercaptan, ethyl mercaptan and propyl mercaptan, dimethyl sulfide, dimethyl disulfide and methyl ethyl sulfide.

The term "sulfur-containing compounds" as used herein is not intended to include thiamine or thiamine precursors or acidic or basic salts of thiamine. Such thiamine salts or precursors of thiamine or thiamine per se are used preferably in addition to the "sulfur-containing compounds" of our invention in the reaction mass.

Additional flavor nuances may be introduced into the reaction product of our invention by incoporating into the reaction mass prior to or during the heat reaction thiazole derivatives, such as, for example, thiamine hydrochloride and/or 4-methyl-5-(β-hydroxyethyl)-thiazole. Instead of using thiamine hydrochloride, the thiamine may be used as a free base; but it is preferably employed as an acid salt and, indeed the hydrochloride is especially suitable. In addition, free amino acids, such as alanine, leucine, valine, glutamic acid and/or various polypetides including dipeptides and tripeptides may also be added to the reaction mass prior to or during the heat reaction process. In addition, quantities of nucleotides may be added prior to, during or subsequent to the reaction between the sulfur-containing compound and meat powder or enzymatic digest of same and egg component or enzymatic digest of same. The preferred nucleotides used in the practice of this invention are mixtures of disodium inosinate and disodium guanylate. In addition, prior to or during the reaction between the sulfur-containing compound and the egg or enzymatic egg digest and meat powder or enzymatic meat digest, a quantity of a saccharide material such as d-xylose, ribose, sucrose, and dextrose may be added in order to modify the resulting meat type flavor.

When producing specific poultry meat flavors, lower alkyl carbonylic materials, such as ketones and alkyl aldehydes can be admixed into the reaction system during or subsequent to the heating step. It is generally preferred to add these materials after heating the reaction mass since they are generally volatile, and losses thereof may occur during the heating. The ketonic materials used in this aspect of the invention are preferably lower alkanones and hydroxy-substituted alkanones containing from about 4 to 8 carbon atoms such as diacetyl, acetyl-methylcarbinol and acetylpropionyl. The alkyl aldehydes are preferably the aldehydes containing from about 5 up to 12 carbon atoms. Especially preferred are n-pentanal, n-hexananl, n-heptanal, 2,4-nonadienal, 2,4-decadienal, and 2,4-undecadienal. Conveniently, these aldehydes and/or ketones are employed at levels ranging from 0.01 up to 0.1 times the combined weight of the meat powder or enzymatic digest thereof and egg component or enzymatic digest thereof used.

The reaction between the sulfur-containing compound, the meat powder or enzymatic digest thereof and the egg component or enzymatic digest thereof is preferably carried out at reflux conditions (usually over 100° C) at pressures of between 1 and 10 atmospheres for periods of times of from 0.2 up to 10 hours. It is to be emphasized that, generally, temperatures above 400° C make the reaction difficult to control and may well produce uncharacteristic burnt notes even with very short reaction times (e.g. of the order of 10 – 20 minutes). Accordingly, it is preferred to carry out the reaction at temperatures of from 100° up to 350° C; until the desired flavor development is achieved. As stated above, the heating periods may range from about 0.2 hours up to about 10 hours depending upon the heating method used.

Where it is desired, the process can be carried out on a batch basis in small quantities of, for example, 50 to 100 grams or it can be carried out batchwise, semicontinuously, or continuously on much larger quantities of 500 kilograms or more.

In preparing the enzymatic digest of the poultry egg, a preferred ratio of enzyme to egg material (e.g. egg yolk, egg white or entire contents of egg) is from 0.1% up to 1%; preferably from 0.1% up to 0.4%. The weight percent of sulfur-containing compound based on enzymatic egg digest is from 1% up to 20%; preferably between 2% and 5%. Where it is desired to use thiazole derivatives for the purpose of introducing additional flavor nuances into the product of our invention, the weight ratio of thiazole derivatives (e.g. thiamine hydrochloride) to sulfur-containing compounds is between 0.25:1 and 1:1; preferably 0.5:1. Where it is desired to use a saccharide material in the reaction mass in order to introduce still additional flavor nuances into the product of our invention, the weight ratio of saccharide to sulfur-containing compound is between 1:100 and 1:3; preferably 1:6.

It should be noted that the presence of the saccharides in the reaction mass gives rise to a reaction product having somewhat intense sweet meat flavor characteristics (e.g. poultry or sweet pork nuances). Care should be exercised in utilizing such saccharides, however, since they may tend to contribute some burnt notes to the ultimate reaction product. When used, suitable results are obtained at levels ranging up to about 25% by weight based on the total weight of the reaction mass. Preferably the range is from 0.5 to 5 weight percent of the overall reaction mass. This range is further limited by the preferred ratio of saccharide to sulfur-containing compound.

Preferably, but not necessarily, a large weight excess of water or other reaction medium (e.g. beef fat, vegetable fat, chicken fat, duck fat, and fatty acid glycerides, such as "Neobee M-5" produced by the Drew Chemical Division of U.S. Filter Corporation or fish oil or mixtures of such fats and oils with water either in emulsified or non-emulsified forms) is used in preparing the enzymatic egg digest of our invention, although such excess is not essential. Varying amounts of water or fat or fish oil, for example from about 1:1 up to about 10:1 by weight based on the total weight of the remainder of the enzymatic egg digest can be used. In the case of aqueous mixtures after mixing of the enzymatic egg digest with the meat powder or enzymatic digest thereof and after the subsequent reaction with the sulfur-containing compound the water can be at least partially evaporated to produce a solid or a semisolid edible composition. When using triglyceride fats, the fatty acids predominantly range in carbon chain length from about 20 carbon atoms up to about 22 carbon atoms. The term triglyceride fat will be understood to mean both fats and oils. It is preferred that the triglyceride fats be refined, bleached and deodorized. They can be in their natural form or they can by hydrogenated.

The quantity of reaction product utilized in the practice of our invention when added to a foodstuff can be varied to provide a wide range of meaty flavors. At levels as low as 0.1%, the reaction product begins to impart a very light, almost undefinable sensation in aqueous solution. As the level is increased to 0.2%, a different pleasant meaty like character is imparted to an aqueous solution. As the level reaches 0.5% a definite, good characteristic beef, veal, pork, lamb or poultry meat like flavor and aroma is obtained and this level persists up to levels of 2 % and beyond, where the substance leaves a light, lingering after taste. At levels higher than 1% not only is the specific meat flavor indistinguishable from the natural meat flavors but the mouthfeel and texture provided by the reaction product of our invention are substantially identical to those properties provided by the natural meat flavor desired. All parts, proportions, percentages and ratios herein are by weight unless otherwise indicated.

The reaction product of our invention can be added in pure form to foodstuffs or in admixture with other flavors and/or aroma imparting ingredients and/or in admixture with other nontoxic edible solvents (e.g. water, ethanol, wines and liqueurs), thickeners (e.g. starch paste) carriers and extenders (e.g. bread crumbs). The resulting mixtures may be used as such or may be further processed as by heating.

It will be understood by those skilled in the art that regardless of the purity of the reactants used they should contain no noxious or noisome components which would interfere with the flavor conferred on foodstuffs or on its safety for use in edible materials.

It is contemplated herein that foodstuffs flavored according to this invention include both solid and liquid preparations for oral consumption by human beings and by animals particularly warm-blooded domestic animals, such as are used for pets or raised for consumption.

The products of our invention may be provided as dry solids, in liquid mixtures or in pastes. Preferably, they are prepared by heating the egg product or enzymatic digest thereof with the meat powder or enzymatic digest, further in conjunction with the sulfur-containing compound wherein at least one of the foregoing materials is admixed with its equal weight of water. The resulting end product may be used as such, or it may be concentrated for use. If solid products are desired, the same may be obtained by drying the liquid mixtures. The aqueous compositions are dehydrated by spray-drying although drum-drying, freeze-drying and other drying procedures are also applicable to the reaction product of our invention. A solid carrier is often added to the liquid mixture before drying.

When carrying out the spray-drying process which is the preferred drying process, we have found that carriers are useful in extending the flavor of our products when so prepared. These carriers do not diminish the quality of the flavor, but they stabilize it and increase the shelf like of the product. Polysaccharides having relatively complex structures such as gum arabic, gum tragacanth, gum karaya and guar gum and mixtures of same are useful, as are cellulose derivatives such as methyl cellulose and carboxy methyl cellulose or partially hydrolyzed starch such as dextrin, and the like.

In a preferred process, an aliquot of the liquid composition is dried and the flavor solids content of the composition determined. An amount of carrier substantially equal to the calculated solids content of the liquid composition is added thereto and the mixture dried, preferably by spray-drying. Alternatively, an amount of carrier substantially equal to the combined weight of the original egg material or enzymatic digest, powdered meat or enzymatic digest thereof and sulfur-containing compound is added to the liquid composition after reaction of the ingredients and then dried. The preferred amount of carrier are from 0.2:1 up to about 2:1 based on the solids content of the liquid mixture.

The following examples illustrate the manner in which we now prefer to practice our invention. It is to be understood that this invention is not to be considered as limited thereto except as indicated in the appended claims. In the examples, the various ingredients are listed in parts by weight.

EXAMPLE I 1.5 Kilograms of chicken egg yolk powder is dissolved in 5.15 kilograms of water and the resulting solution is admixed with 7.5 grams papain for a period of 2 hours at a temperature of 65° C with stirring. At the end of the two-hour period, the resulting enzymatic digest is intimately admixed with 44 grams of cysteine hydrochloride, 70 grams of dry dark chicken meat granules and 22 grams of thiamine hydrochloride. The resulting mixture is then heated at reflux for a period of 4 hours. To 5 kilograms of the resulting product 2.22 kilograms of a 45% aqueous gum arabic solution is added. The resulting mixture is spray-dried to produce an excellent chicken flavor in so far as flavor nuances, mouthfeel and texture are concerned.

EXAMPLE II

A chicken noodle soup is prepared by mixing together

| Ingredient | Grams |
| --- | --- |
| Salt | 5.00 |
| The spray dried flavor of Example I | 6.00 |
| Gelatin (180 bloom) | 1.00 |
| Monosodium glutamate | .40 |
| Caramel color | .40 |
| Garlic powder | .10 |
| White pepper, ground | .06 |
| Mixed vegetable pieces | 36.00 |

Three cups of water are added to the above mixture; and the mix is brought to a full boil, simmered for 5 minutes, and is then ready to serve.

EXAMPLE III 0.085 Kilograms of the contents of whole fresh chicken eggs are admixed with 1.7 grams of papain with stirring for a period of 2 hours at a temperature of 65° C. The resulting enzymatic digest is then intimately admixed with 12.75 grams of cysteine hydrochloride, 20 grams of dry chicken meat granules and 6.375 grams of thiamine hydrochloride. The resulting mixture is refluxed for a period of four hours with stirring. 0.8 Kilograms of the resulting flavor is then admixed with 0.356 kilograms of a 45% aqueous gum arabic solution and the resulting mixture is spray-dried yielding 315 grams of a product having a flavor closely resembling natural chicken flavor in so far as flavor nuances, mouthfeel and texture are concerned.

EXAMPLE IV

A chicken noodle soup is prepared by mixing together:

| Ingredient | Grams |
| --- | --- |
| Salt | 5.00 |
| The spray dried flavor of Example III | 1.00 |
| Gelatin (180 bloom) | 1.00 |
| Monosodium glutamate | .40 |
| Caramel color | .40 |
| Garlic Powder | .10 |
| White pepper, ground | .06 |
| Mixed vegetable pieces | 36.00 |

Three cups of water are added to the above mixture; and the mix is brought to a full boil, simmered for 5 minutes, and is then ready to serve.

EXAMPLE V

In a pressurized scraped wall "Giusti" reaction vessel the following materials are introduced:

| Chicken egg yolk powder | 12 kg |
| --- | --- |
| Water | 41.2 kg |
| Papain | 0.06 kg |

The reactor is operated for a period of two hours at 65° C after which 0.704 kg. of cysteine hydrochloride, 0.704 kilos of dry chicken meat granules and 0.352 kg. of thiamine hydrochloride is added. The reaction vessel is operated for a period of 30 minutes at a temperature of 130° C and at a pressure in the range of from 2 up to 3 atmospheres. The reaction mass is then cooled yielding a product having an excellent chicken flavor in so far as flavor nuances, mouthfeel and texture are concerned.

EXAMPLE VI 1.96 Kilograms of the contents of whole fresh turkey eggs is admixed with 4 grams of papain and the resulting mixture is heated with stirring at 65° C for a period of 2 hours. The resulting enzymatic digest is admixed with 200 grams of dry turkey meat granules, 58.8 grams of cysteine hydrochloride and 29.4 grams of thiamine hydrochloride. The resulting mixture is refluxed at atmospheric pressure for a period of four hours with stirring. The resulting slurry is then cooled and filtered. 1.4 Kilograms of the filtrate is then intimately admixed with 623 grams of a 45% aqueous gum arabic solution and the resulting mixture is spray-dried. The resulting solid spray-dried material has an excellent natural-like turkey meat flavor in so far as flavor nuances, mouthfeel and texture are concerned.

EXAMPLE VII 1.6 Kilograms of the contents of whole fresh duck eggs is admixed with 3.2 grams of papain and the resulting mixture is stirred for a period of two hours at 65° C. The resulting enzymatic digest is then admixed with 22 grams of dry duck meat granules, 48 grams of cysteine hydrochloride and thiamine hydrochloride. The resulting mixture is then refluxed at atmospheric pressure for a period of four hours with stirring. The resulting slurry is then cooled to room temperature and filtered. 1.4 Kilograms of the resulting filtrate is then admixed with 778 grams of a 45% aqueous gum arabic solution and this mixture is spray-dried, yielding 580 grams of a solid material having an excellent duck meat flavor in so far as flavor nuances, mouthfeel and texture are concerned.

EXAMPLE VIII

A duck noodle soup is prepared by mixing together:

| Ingredient | Grams |
| --- | --- |
| Salt | 5.00 |
| The spray dried flavor of Example VII | 1.00 |
| Gelatin (180 bloom) | 1.00 |
| Monosodium glutamate | .40 |
| Caramel color | .40 |
| Garlic powder | .10 |
| White pepper, ground | .06 |
| Mixed vegetable pieces | 36.00 |

Three cups of water are added to the above mixture; and the mix is brought to a full boil, simmered for five minutes, and is then ready to serve.

EXAMPLE IX

875 Grams of the contents of whole fresh chicken eggs is admixed with 1.75 grams of papain and the resulting mixture is stirred for a period of two hours at 65° C. The resulting enzymatic digest is then admixed with 150 grams of dry white chicken meat granules, 26.25 grams of cysteine hydrochloride, 13.25 grams of thiamine hydrochloride and 4.4 grams of d-xylose. The resulting mixture is then refluxed at atmospheric pressure for a period of four hours with stirring. The resulting product has an excellent chicken flavor in so far as flavor nuances, mouthfeel and texture are concerned.

EXAMPLE X

The following ingredients are admixed to form a chicken soup concentrate:

| Ingredients | Grams |
| --- | --- |
| Salt | 312 |
| Hydrogenated peanut oil | 260 |
| Monosodium glutamate | 155 |
| Chicken flavor produced by Example IX | 78 |
| Turmeric extract in 10% ethyl alcohol | 5.2 |
| Spices | 26 |
| Hydrolyzed vegetable protein | 156 |
| Dried parsley leaf | 5.2 |

20 Grams of the foregoing concentrate is admixed with one liter of water at a temperature of 85°. The resulting mixture is boiled for a period of three minutes yielding a flavorful chicken soup.

EXAMPLE XI

300 Grams of chicken egg yolk powder is intimately admixed with 80 grams of chicken meat granules, 8.8 grams of cysteine hydrochloride, 4.4 grams of thiamine hydrochloride and 1030 grams of water. The resulting slurry is then heated to reflux at one atmosphere absolute pressure and maintained at reflux with stirring for a period of four hours. The resulting slurry is divided into two equal portions; portion A and portion B. Portion A is filtered. An aliquot of the filtrate is withdrawn and dried. Based on the weight of the dry product obtained, sufficient gum arabic is added to the filtrate to provide a composition containing one part of weight of flavor solids and one part by weight of gum arabic. The composition is then spray-dried to produce a dry product with an intense chicken flavor having a very close resemblance to natural chicken flavor (Product A) in so far as flavor nuances, mouthfeel and texture are concerned. Product B (portion B produced supra) also has an intense chicken flavor having a very close resemblance to natural chicken flavor in so far as flavor nuances, mouthfeel and texture are concerned.

EXAMPLE XII

A chicken noodle soup is prepared by mixing together

| Ingredient | Gms./Unit |
| --- | --- |
| Salt | 5.00 |
| Product A produced in Example XIII | 6.00 |
| Gelatine (180 bloom) | 1.00 |
| Monosodium glutamate | .40 |
| Caramel color | .40 |
| Garlic powder | .10 |
| White pepper, ground | .06 |
| Mixed vegetable pieces | 36.00 |

Three cups of water are added to the above mixture; and the mix is brought to a full boil, simmered for 5 minutes, and is then ready to serve.

EXAMPLE XIII

A chicken noodle soup is prepared by mixing together

| Ingredient | Grams |
| --- | --- |
| Salt | 5.00 |
| Product B produced in Example XI | 6.00 |
| Gelatin (180 bloom) | 1.00 |
| Monosodium glutamate | .40 |

| Ingredient | Grams |
| --- | --- |
| Caramel color | .40 |
| Garlic powder | .10 |
| White pepper, ground | .06 |
| Mixed vegetable pieces | 36.00 |

Three cups of water are added to the above mixture; and the mix is brought to a full boil, simmered for 5 minutes, and is then ready to serve.

EXAMPLE XIV 0.85 Kilograms of the contents of whole fresh chicken eggs are admixed with 0.45 kilos of dry chicken meat granules, 12.75 grams of cysteine hydrochloride and 6.375 grams of thiamine hydrochloride. The resulting mixture is refluxed for a period of four hours with stirring. 0.8 Kilograms of the resulting flavor is then admixed with 0.356 kilograms of a 45% aqueous gum arabic solution and the resulting mixture is spray-dried yielding 315 grams of a product having a flavor closely resembling natural chicken flavor in so far as flavor nuances, mouthfeel and texture are concerned.

EXAMPLE XV

A chicken noodle soup is prepared by mixing together:

| Ingredient | Grams |
| --- | --- |
| Salt | 5.00 |
| The spray dried flavor of Example XIV | 1.00 |
| Gelatin (180 bloom) | 1.00 |
| Monosodium glutamate | .40 |
| Caramel color | .40 |
| Garlic powder | .10 |
| White pepper, ground | .06 |
| Mixed vegetable pieces | 36.00 |

Three cups of water are added to the above mixture; and the mix is brought to a full boil, simmered for 5 minutes, and is then ready to serve.

EXAMPLE XVI

In a pressurized scraped wall "Giusti" reaction vessel the following materials are introduced:

| | |
| --- | --- |
| Chicken egg yolk powder | 12 kg |
| Water | 41.2 kg |

0.704 kg. of cysteine hydrochloride, 0.19 kilos dry chicken meat granules and 0.352 kilos of thiamine hydrochloride is added and the reaction vessel is operated for a period of 30 minutes at a temperature of 130° C and at a pressure in the range of from 2 up to 3 atmospheres. The reaction mass is then cooled yielding a product having an excellent chicken flavor in so far as flavor nuances, mouthfeel and texture are concerned.

EXAMPLE XVII 1.96 Kilograms of the contents of whole fresh turkey eggs is admixed with 32 grams of dry white turkey meat granules, 58.8 grams of cysteine hydrochloride and 29.4 grams of thiamine hydrochloride. The resulting mixture is refluxed at atmospheric pressure for a period of four hours with stirring. The resulting slurry is then cooled and filtered. 1.4 Kilograms of the filtrate is then intimately admixed with 623 grams of a 45% aqueous gum arabic solution and the resulting mixture is spray-dried. The resulting solid spray-dried material has an excellent natural-like turkey meat flavor in so far as flavor nuances, mouthfeel and texture are concerned.

EXAMPLE XVIII 1.6 Kilograms of the contents of whole fresh duck eggs is admixed with 50 grams of dry duck meat granules, 48 grams of cysteine hydrochloride and thiamine hydrochloride. The resulting mixture is then refluxed at atmospheric pressure for a period of four hours with stirring. The resulting slurry is then cooled to room temperature and filtered. 1.4 Kilograms of the resulting filtrate is then admixed with 778 grams of a 45% aqueous gum arabic solution and this mixture is spray-dried, yielding 580 grams of a solid material having an excellent duck meat flavor in so far as flavor nuances, mouthfeel and texture are concerned.

EXAMPLE XIX

A duck noodle soup is prepared by mixing together:

| Ingredient | Grams |
| --- | --- |
| Salt | 5.00 |
| The spray dried flavor of Example XVIII | 1.00 |
| Gelatin (180 bloom) | 1.00 |
| Monosodium glutamate | .40 |
| Caramel color | .40 |
| Garlic powder | .10 |
| White pepper, ground | .06 |
| Mixed vegetable pieces | 36.00 |

Three cups of water are added to the above mixture, and the mix is brought to a full boil, simmered for 5 minutes, and is then ready to serve.

EXAMPLE XX

875 Grams of the contents of whole fresh chicken eggs are admixed with 150 grams of dry chicken meat granules, 26.25 grams of cysteine hydrochloride, 13.25 grams of thiamine hydrochloride and 4.4 grams of d-xylose. The resulting mixture is then refluxed at atmospheric pressure for a period of four hours with stirring. The resulting product has an excellent intense chicken flavor in so far as flavor nuances, mouthfeel and texture are concerned.

EXAMPLE XXI

The following ingredients are admixed to form a chicken soup concentrate:

| Ingredients | Grams |
| --- | --- |
| Salt | 312 |
| Hydrogenated peanut oil | 260 |
| Monosodium glutamate | 155 |
| Chicken flavor produced by Example XX | 78 |
| Turmeric extract in 10% ethyl alcohol | 5.2 |
| Spices | 26 |
| Hydrolyzed vegetable protein | 156 |
| Dried parsley leaf | 5.2 |

20 Grams of the foregoing concentrate is admixed with one liter of water at a temperature of 85° C. The resulting mixture is refluxed for a period of 3 minutes yielding a flavorful chicken soup.

EXAMPLE XXII 2.2 Kilograms of chicken egg white powder, dissolved in 6.5 kilograms of water is intimately admixed with 58 grams of dry chicken meat granules, 68 grams of 2-amino ethane sulfonic acid sodium salt (taurine) and 34 grams of thiamine hydrochloride. The resulting slurry is then heated to reflux and maintained at reflux with stirring for a period of 4 hours. The resulting slurry is filtered yielding 5.1 kilograms of filtrate. An aliquot of the filtrate is withdrawn and dried. Based on the weight of the dry product obtained, sufficient gum arabic is added to the filtrate to provide a composition containing one part by weight of flavor solid and one part by weight of gum arabic. The composition is then spray-dried to produce a dry product with an intense chicken flavor having a very close resemblance to natural chicken flavor in so far as flavor nuances, mouthfeel and texture are concerned.

EXAMPLES XXIII - XXVII

The following mixtures are each refluxed for a period of five hours at atmospheric pressure. In each case in intense chicken flavor having a close resemblance to the flavor of natural chicken meat is produced.

| Ingredients | Parts by Weight | | | | |
|---|---|---|---|---|---|
| | XXIII | XXIV | XXV | XXVI | XXVII |
| L-cysteine hydrochloride | 20 | 20 | 20 | 6.80 | 136 |
| Thiamine hydrochloride | 20 | 20 | 20 | 9.35 | 187 |
| Chicken egg yolk solids | 100 | 100 | 100 | 1.15 | 115 |
| Water | 700 | 700 | 700 | — | — |
| Dextrose | 10 | — | 10 | .13 | 1.30 |
| Arabinose | — | 10 | — | — | — |
| Chicken fat | 150 | 150 | 150 | .40 | 60 |
| Powder chicken meat average mesh size 40 | 100 | 100 | 50 | 50 | 50 |
| NaH$_2$PO$_4$ | | | | | |

EXAMPLE XXVIII

Into a 300 ml flask equipped with stirrer, thermometer and heating mantle the following materials are placed:
50 grams — ground raw turkey meat
100 ml — water
2.5 grams — Mylase enzyme The pH of the contents of the flasks is adjusted to exactly 5.0 by addition thereto of phosphoric acid. The contents of the flask is prepasteurized for 30 minutes at 60° C. The contents of the flask are then incubated at 50° C using agitation (250 RPM) for a period of 120 hours. The resulting enzymatic turkey digest is used in the reaction flavors as set forth in the several examples following.

EXAMPLE XXIX

The procedure of Example XXVIII is carried out using the following quantities of turkey meat paste and enzymes except that the pH of the mixture is first adjusted to 4.6 using a buffer which is a one molar solution of sodium citrate and sodium diacid phosphate:

| Quantity of Turkey Meat Paste | Enzyme and Quantity |
|---|---|
| 100 gms. | 0.1 gms. prolase |
| 100 gms. | 0.1 gms. bromelain |
| 100 gms. | 0.1 gms. papain |
| 100 gms. | 0.1 gms. pilzprotease S |
| 100 gms. | 0.1 gms. rhozyme P 11 |
| 100 gms. | 0.1 gms. bromelin |
| 100 gms. | 0.1 gms. pepsin |
| 100 gms. | 0.1 gms. trypsin |
| 100 gms. | 0.1 gms. J-25 |
| 100 gms. | 0.1 gms. protease 62 |
| 100 gms. | 0.1 gms. HT proteolytic 200 |
| 100 gms. | 0.1 gms. fungal protease |

-continued

| Quantity of Turkey Meat Paste | Enzyme and Quantity |
|---|---|
| 100 gms. | 0.1 gms. prolase MT-7820 |
| 100 gms. | 0.1 gms. molsin |
| 100 gms. | 0.1 gms. mylase |
| 100 gms. | 0.1 gms. bakterien |
| 100 gms. | 0.1 gms. protease |

The resulting enzymatic turkey digest is used in the reaction flavors as set forth in the several examples following.

EXAMPLE XXX

Into a 300 ml flask equipped with stirrer, thermometer and heating mantle, the following materials are placed:
50 grams — ground raw chicken meat
100 ml — water
2.5 grams — Mylase enzyme The pH of the contents of the flasks is adjusted to exactly 5.0 by addition thereto of phosphoric acid. The contents of the flask is prepasteurized for 30 minutes at 60° C. The contents of the flask are then incubated at 50° C using agitation (250 RPM) for a period of 120 hours. The resulting enzymatic chicken digest is used in the reaction flavors as set forth in the several examples following:

EXAMPLE XXXI

The procedure of Example XXX is carried out using the following quantities of chicken meat paste and enzymes except that the pH of the mixture is first adjusted to 4.6 using a buffer which is a one molar solution of sodium citrate and sodium diacid phosphate:

| Quantity of Chicken Meat Paste | Enzyme and Quantity |
|---|---|
| 100 gms. | 0.1 gms. prolase |
| 100 gms. | 0.1 gms. bromelain |
| 100 gms. | 0.1 gms. papain |
| 100 gms. | 0.1 gms. pilzprotease S |
| 100 gms. | 0.1 gms. rhozyme P 11 |
| 100 gms. | 0.1 gms. bromelin |
| 100 gms. | 0.1 gms. pepsin |
| 100 gms. | 0.1 gms. trypsin |
| 100 gms. | 0.1 gms. J-25 |
| 100 gms. | 0.1 gms. protease 62 |
| 100 gms. | 0.1 gms. HT proteolytic 200 |
| 100 gms. | 0.1 gms. fungal protease |
| 100 gms. | 0.1 gms. prolase MT-7820 |
| 100 gms. | 0.1 gms. molsin |
| 100 gms. | 0.1 gms. mylase |
| 100 gms. | 0.1 gms. bakterien |
| 100 gms. | 0.1 gms. protease |

The resulting enzymatic chicken digest is used in the reaction flavors as set forth in the several examples following:

EXAMPLE XXXII 2.2 Kilograms of chicken egg white powder, dissolved in 6.5 kilograms of water is intimately admixed with 8.8 grams of papain for a period of 2 hours at a temperature of 65° C under agitation. The resulting enzymatic digest is then intimately admixed with 68 grams of cysteine hydrochloride, 30 grams of enzymatic chicken meat digest according to the process of Example XXX and 34 grams of thiamine hydrochloride. The resulting slurry is then heated to reflux and maintained at reflux with stirring for a period of four hours. The resulting slurry is filtered yielding 5.1 kilograms of filtrate. An aliquot of the filtrate is withdrawn and dried. Based on the weight of the dry product obtained, sufficient gum arabic is added to the filtrate to provide a composition containing one part by weight of flavor solids and one part by weight of gum arabic. The composition is then spray-dried to produce a dry product with an intense chicken flavor having a very close resemblance to natural chicken flavor in so far as flavor nuances, mouthfeel and texture are concerned.

EXAMPLE XXXIII 1.5 Kilograms of chicken egg yolk powder is dissolved in 5.15 kilograms of water and the resulting solution is admixed with 7.5 grams papain for a period of two hours at a temperature of 65° C with stirring. At the end of the two-hour period, the resulting enzymatic digest is intimately admixed with 44 grams of cysteine hydrochloride, 70 grams of enzymatic chicken meat digest according to the process of Example XXX and 22 grams of thiamine hydrochloride. The resulting mixture is then heated at reflux for a period of four hours. To 5 kilograms of the resulting product 2.22 kilograms of a 45% aqueous gum arabic solution is added. The resulting mixture is spray-dried to produce an excellent chicken flavor in so far as flavor nuances, mouthfeel and texture are concerned.

EXAMPLE XXXIV

A chicken noodle soup is prepared by mixing together

| Ingredient | Grams |
| --- | --- |
| Salt | 5.00 |
| The spray dired flavor of Example XXXIII | 6.00 |
| Gelatin (180 bloom) | 1.00 |
| Monosodium glutamate | .40 |
| Caramel color | .40 |
| Garlic powder | .10 |
| White pepper, ground | .06 |
| Mixed vegetable pieces | 36.00 |

Three cups of water are added to the above mixture; and the mix is brought to a full boil, simmered for 5 minutes, and is then ready to serve.

EXAMPLE XXXV 0.085 Kilograms of the contents of whole fresh chicken eggs are admixed with 1.7 grams of papain with stirring for a period of 2 hours at a temperature of 65° C. The resulting enzymatic digest is then intimately admixed with 12.75 grams of cysteine hydrochloride, 20 grams of enzymatic chicken meat digest according to the process of Example XXXI and 6.375 grams of thiamine hydrochloride. The resulting mixture is refluxed for a period of 4 hours with stirring. 0.8 Kilograms of the resulting flavor is then admixed with 0.356 kilograms of a 45% aqueous gum arabic solution and the resulting mixture is spray-dried yielding 315 grams of a product having a flavor closely resembling natural chicken flavor in so far as flavor nuances, mouthfeel and texture are concerned.

EXAMPLE XXXVI

A chicken noodle soup is prepared by mixing together:

| Ingredient | Grams |
| --- | --- |
| Salt | 5.00 |
| The spray dried flavor of Example XXXV | 1.00 |
| Gelatine (180 bloom) | 1.00 |
| Monosodium glutamate | .40 |
| Caramel color | .40 |
| Garlic powder | .10 |
| White pepper, ground | .06 |
| Mixed vegetable pieces | 36.00 |

Three cups of water are added to the above mixture; and the mix is brought to a full boil, simmered for 5 minutes, and is then ready to serve.

EXAMPLE XXXVII

In a pressurized scraped wall "Giusti" reaction vessel the following materials are introduced:

| Chicken egg yolk powder | 12 kg |
| --- | --- |
| Water | 41.2 kg |
| Papain | 0.06 kg |

The reactor is operated for a period of two hours at 65° C after which 0.704 kg. of cysteine hydrochloride, 0.704 kilos of enzymatic chicken meat digest according to the process of Example XXXI, and 0.352 kg. of thiamine hydrochloride is added. The reaction vessel is operated for a period of 30 minutes at a temperature of 130° C and at a pressure in the range of from 2 up to 3 atmospheres. The reaction mass is then cooled yielding a product having an excellent chicken flavor in so far as flavor nuances, mouthfeel and texture are concerned.

EXAMPLE XXXVIII 1.96 Kilograms of the contents of whole fresh turkey eggs is admixed with 4 grams of papain and the resulting mixture is heated with stirring at 65° C for a period of 2 hours. The resulting enzymatic digest is admixed with 200 grams of enzymatic turkey meat digest according to the process of Example XXVIII, 58.8 grams of cysteine hydrochloride and 29.4 grams of thiamine hydrochloride. The resulting mixture is refluxed at atmospheric pressure for a period of four hours with stirring. The resulting slurry is then cooled and filtered. 1.4 Kilograms of the filtrate is then intimately admixed with 623 grams of a 45% aqueous gum arabic solution and the resulting mixture is spray-dried. The resulting solid spray-dried material has an excellent natural-like turkey meat flavor in so far as flavor nuances, mouthfeel and texture are concerned.

EXAMPLE XXXIX 875 grams of the contents of whole fresh chicken eggs is admixed with 1.75 grams of papain and the resulting mixture is stirred for a period of 2 hours at 65° C. The resulting enzymatic digest is then admixed with 150 grams of enzymatic chicken meat digest according to the process of Example XXXI, 26.25 grams of cysteine hydrochloride, 13.25 grams of thiamine hydrochloride and 4.4 grams of d-xylose. The resulting mixture is then refluxed at atmospheric pressure for a period of four hours with stirring. The resulting product has an excellent chicken flavor in so far as flavor nuances, mouthfeel and textre are concerned.

EXAMPLE XXXX

The following ingredients are admixed to form a chicken soup concentrate:

| Ingredients | Grams |
| --- | --- |
| Salt | 312 |
| Hydrogenated peanut oil | 260 |
| Monosodium glutamate | 155 |
| Chicken flavor produced by Example XXXIX | 78 |
| Turmeric extract in 10% ethyl alcohol | 5.2 |
| Spices | 26 |
| Hydrolyzed vegetable protein | 156 |
| Dried parsley leaf | 5.2 |

20 Grams of the foregoing concentrate is admixed with one liter of water at a temperature of 85° C. The resulting mixture is boiled for a period of three minutes yielding a flavorful chicken soup.

EXAMPLE XXXXI 300 grams of chicken egg yolk powder is intimately admixed with 80 grams of enzymatic chicken meat digest according to the process of Example XXX, 8.8 grams of cysteine hydrochloride, 4.4 grams of thiamine hydrochloride and 1030 grams of water. The resulting slurry is then heated to reflux at one atmosphere absolute pressure and maintained at reflux with stirring for a period of 4 hours. The resulting slurry is divided into two equal portions; portion A and portion B. Portion A is filtered. An aliquot of the filtrate is withdrawn and dried. Based on the weight of the dry product obtained, sufficient gum arabic is added to the filtrate to provide a composition containing one part by weight of flavor solids and one part by weight of gum arabic. The composition is then spray-dried to produce a dry product with an intense chicken flavor having a very close resemblance to natural chicken flavor (Product A) in so far as flavor nuances, mouthfeel and texture are concerned. Product B (portion B produced supra) also has an intense chicken flavor having a very close resemblance to natural chicken flavor in so far as flavor nuances, mouthfeel and texture are concerned.

EXAMPLE XXXXII

A chicken noodle soup is prepared by mixing together

| Ingredient | Gms./Unit |
| --- | --- |
| Salt | 5.00 |
| Product A produced in Example XXXXI | 6.00 |
| Gelatin (180 bloom) | 1.00 |
| Monosodium glutamate | .40 |
| Caramel color | .40 |
| Garlic powder | .10 |
| White pepper, ground | .06 |
| Mixed vegetable pieces | 36.00 |

Three cups of water are added to the above mixture; and the mix is brought to a full boil, simmered for 5 minutes, and is then ready to serve.

EXAMPLE XXXXIII

A chicken noodle soup is prepared by mixing together

| Ingredient | Grams |
| --- | --- |
| Salt | 5.00 |
| Product B produced in Example XXXXI | 6.00 |
| Gelatin (180 bloom) | 1.00 |
| Monosodium glutamate | .40 |
| Caramel color | .40 |
| Garlic powder | .10 |
| White pepper, ground | .06 |
| Mixed vegetable pieces | 36.00 |

Three cups of water are added to the above mixture; and the mix is brought to a full boil, simmered for 5 minutes, and is then ready to serve.

EXAMPLE XXXXIV 0.85 Kilograms of the contents of whole fresh chicken eggs are admixed with 0.45 kilos of enzymatic chicken meat digest according to the process of Example XXX, 12.75 kilos of cysteine hydrochloride and 6.375 kilos of thiamine hydrochloride. The resulting mixture is refluxed for a period of four hours with stirring. 0.8 Kilograms of the resulting flavor is then admixed with 0.356 kilograms of a 45% aqueous gum arabic solution and the resulting mixture is spray-dried yielding 315 grams of a product having a flavor closely resembling natural chicken flavor in so far as flavor nuances, mouthfeel and texture are concerned.

EXAMPLE XXXXV

A chicken noodle soup is prepared by mixing together:

| Ingredient | Grams |
| --- | --- |
| Salt | 5.00 |
| The spray dried flavor of Example XXXIV | 1.00 |
| Gelatin (180 bloom) | 1.00 |
| Monosodium glutamate | .40 |
| Caramel color | .40 |
| Garlic powder | .10 |
| White pepper, ground | .06 |
| Mixed vegetable pieces | 36.00 |

Three cups of water are added to the above mixture; and the mix is brought to a full boil, simmered for 5 minutes, and is then ready to serve.

EXAMPLE XXXXVI

In a pressurized scraped wall "Giusti" reaction vessel the following materials are introduced:

| Chicken egg yolk powder | 12 kg |
| --- | --- |
| Water | 41.2 kg |

0.704 kg. of cysteine hydrochloride, 0.19 kilos enzymatic chicken meat digest according to the process of Example XXX and 0.352 kilos of thiamine hydrochloride is added and the reaction vessel is operated for a period of 30 minutes at a temperature of 130° C and at a pressure in the range of from 2 up to 3 atmospheres. The reaction mass is then cooled yielding a product having an excellent chicken flavor in so far as flavor nuances, mouthfeel and texture are concerned.

EXAMPLE XXXXVII 1.96 Kilograms of the contents of whole fresh turkey eggs is admixed with 32 grams of enzymatic turkey meat digest according to the process of Example XXVIII, 58.8 grams of cysteine hydrochloride and 29.4 grams of thiamine hydrochloride. The resulting mixture is refluxed at atmospheric pressure for a period of four hours with stirring. The resulting slurry is then cooled and filtered. 1.4 Kilograms of the filtrate is then intimately admixed with 623 grams of a 45% aqueous gum arabic solution and the resulting mixture is spray-dried. The resulting solid spray-dried material has an excellent naturallike turkey meat flavor in so far as flavor nuances, mouthfeel and texture are concerned.

EXAMPLE XXXXVIII

A duck noodle soup is prepared by mixing together:

| Ingredient | Grams |
|---|---|
| Salt | 5.00 |
| The spray dried flavor of Example XXXXVII | 1.00 |
| Gelatin (180 bloom) | 1.00 |
| Monosodium glutamate | .40 |
| Caramel color | .40 |
| Garlic powder | .10 |
| White pepper, ground | .06 |
| Mixed vegetable pieces | 36.00 |

Three cups of water are added to the above mixture, and the mix is brought to a full boil, simmered for 5 minutes, and is then ready to serve.

EXAMPLE XXXXIX

875 Grams of the contents of whole fresh chicken eggs are admixed with 150 grams of enzymatic chicken meat digest according to the process in Example XXX, 26.25 grams of cysteine hydrochloride, 13.25 grams of thiamine hydrochloride and 4.4 grams of d-xylose. The resulting mixture is then refluxed at atmospheric pressure for a period of four hours with stirring. The resulting product has an excellent intense chicken flavor in so far as flavor nuances, mouthfeel and texture are concerned.

EXAMPLE L

The following ingredients are admixed to form a chicken soup concentrate:

| Ingredients | Grams |
|---|---|
| Salt | 312 |
| Hydrogenated peanut oil | 260 |
| Monosodium glutamate | 155 |
| Chicken flavor produced by Example XXXXIX | 78 |
| Turmeric extract in 10% ethyl alcohol | 5.2 |
| Spices | 26 |
| Hydrolyzed vegetable protein | 156 |
| Dried parsley leaf | 5.2 |

20 Grams of the foregoing concentrate is admixed with one liter of water at a temperature of 85° C. The resulting mixture is refluxed for a period of three minutes yielding a flavorful chicken soup.

EXAMPLE LI (CONTROL)

1.5 Kilograms of chicken egg yolk powder is dissolved in 5.15 kilograms of water and the resulting solution is admixed with 7.5 grams papain for a period of 120 hours at a temperature of 65° C with stirring. At the end of the two-hour period, the resulting enzymatic digest is intimately admixed with 700 grams of ground beef steak and 22 grams of thiamine hydrochloride. The resulting mixture is spray-dried but the flavor of the spray-dried material has little resemblance to a meaty flavor. Indeed, it is eggy, weak, and unsavory.

EXAMPLE LII (CONTROL)

875 grams of enzymatic digest of chicken egg yolk powder produced according to Example LI are admixed with 300 grams of hydrochloride vegetable protein (NESTLE-4 BE) and 4.4 grams of d-xylose. The resulting mixture is refluxed at atmospheric pressure for a period of 4 hours with stirring. Unlike the product produced by Example LII, the resulting product produced herein has no meat characteristics but can be described as having a burnt caramel taste and aroma.

EXAMPLE LIII 0.085 kilograms of the contents of whole fresh chicken eggs are admixed with 1.7 grams of papain with stirring for a period of 120 hours at a temperature of 65° C, thereby forming an enzymatic egg digest.

50 grams of ground chuck (24% fat) is admixed with 850 ml deionized water, 150 grams of sodium citrate phosphate buffer (pH 4.6) and 1.5 grams of papain enzyme. The resulting mixture is stirred (250 RPM) with heating at 65° C for a period of 120 hours thereby yielding an enzymatic beef digest.

50 grams of enzymatic egg digest is then admixed with 30 grams of the enzymatic beef digest, 1.5 grams of cysteine hydrochloride and 18.7 ml of deionized water. The resulting mixture is then heated to reflux at one atmospheric pressure maintained at reflux with stirring for a period of four hours. The reaction product has a good beef flavor with slight sulfury notes.

EXAMPLE LIV 50 grams of enzymatic egg digest prepared according to the process of Example LIII is admixed with 30 grams of enzymatic beef digest prepared according to the process of Example LXV, 1.5 grams of cysteine hydrochloride, 0.75 grams of thiamine hydrochloride and 18 grams of deionized water. The resulting mixture is maintained at reflux at atmospheric pressure for a period of four hours. The resulting meat flavor has an excellent roast beef character.

EXAMPLE LV 50 grams of fresh whole chicken eggs is admixed with 30 grams of fresh ground beef, 1.5 grams of cysteine hydrochloride, 0.7 grams of thiamine hydrochloride and 18 ml of deionized water. The resulting mixture is refluxed at atmospheric pressure for a period of four hours. The resulting flavor is meaty but of lesser intensity than the flavors produced in Examples LIII or LIV.

EXAMPLE LVI 50 grams of whole fresh chicken is admixed with 30 grams of enzymatic beef digest produced according to the process in Example LIII, 1.5 grams of cysteine hydrochloride, 0.7 grams of thiamine hydrochloride and 18 ml of deionized water. The resulting mixture is refluxed at atmospheric pressure for a period of four hours. The resulting meat flavor has excellent meat character, is more intense than the material prepared by the process in Example LV, but is less intense than the materials prepared by the processes of Examples LIII and LIV.

EXAMPLE LVII 50 grams of whole fresh chicken eggs is admixed with 30 grams of fresh ground beef, 1.5 grams of cysteine hydrochloride and 18.7 grams of deionized water. The resulting mixture is refluxed at atmospheric pressure for a period of four hours. The resulting meat flavor has good beef notes of low intensity.

EXAMPLE LVIII 50 grams of whole fresh chicken eggs is admixed with 30 grams of enzymatic beef digest prepared according to the process in Example LIII, 1.5 grams of cysteine hydrochloride and 18.7 grams of deionized water. The resulting mixture is refluxed with stirring at atmospheric pressure for a period of four hours. The resulting meat flavor has good beef nuances but is of low intensity.

EXAMPLE LIX 50 grams of enzymatic egg digest produced according to the process in Example LIII is admixed with 30 grams of fresh ground beef, 1.5 grams of cysteine hydrochloride and 18.7 grams of deionized water. The resulting mixture is refluxed with stirring at atmospheric pressure for a period of four hours. The resulting meat flavor has excellent beef nuances with sulfury notes. The intensity of the flavor is greater than that produced by the processes in Examples LVII and LVIII.

EXAMPLE LX 50 grams of enzymatic egg digest produced according to the process of Example LIII is then admixed with 30 grams of fresh ground beef, 1.5 grams of cysteine hydrochloride, 0.7 grams of thiamine hydrochloride and 19 grams of deionized water. The resulting mixture is refluxed with stirring at atmospheric pressure for a period of four hours. The resulting flavor has an excellent beef character with eggy nuances. Its intensity is greater than that of the flavor produced according to the process of Example LIX.

EXAMPLE LXI (CONTROL)

500 grams of chicken meat is admixed with 150 grams of sodium citrate phosphate buffer (pH-4.6), 850 grams of deionized water and 1.5 grams of papain in a 3 liter round bottom flask. The contents of the flask are then incubated at 65° C using agitation (250 RPM) for a period of 120 hours. The pH of the contents of the flask is then 5.4. The material so produced is herein called "enzymatic chicken digest." 50 grams of enzymatic egg digest produced according to Example LIII is admixed with 30 grams of enzymatic chicken digest, 0.7 grams of thiamine hydrochloride and 19.5 ml of deionized water. The resulting mixture is refluxed with stirring at atmospheric pressure for a period of 4 hours. The resulting flavor is described as eggy, weak and unsavory as compared with the flavors produced by the processes of Examples LIII through LX.

What is claimed is:

1. A process for preparing an edible poultry-flavored foodstuff flavor composition comprising the steps of (A) intimately admixing in the absence of any natural meat products except enzymatic chicken meat digest, a composition consisting essentialy of (i) a poultry egg product selected from the group consisting of powdered chicken egg yolk, enzymatic digest of the whole internal contents of poultry egg and enzymatic digest of poultry egg yolk; (ii) L-cysteine hydrochloride; (iii) thiamine hydrochloride and (iv) enzymatic chicken meat digest, said poultry egg product, said L-cysteine hydrochloride, said thiamine hydrochloride and said enzymatic chicken meat digest each being present in an amount to produce a poultry meat flavor, the weight ratio of said thiamine hydrochloride:cysteine hydrochloride being from 0.25:1 up to 1:1, and (B) heating the resulting mixture at a temperature of from 100° C up to 350° C and for a period of time of from 0.2 hrs. up to 10 hrs. whereby a poultry meat flavored product is produced.

2. A poultry-flavored food comprising at least 0.2% by weight of said food of the product produced by the process of claim 1 intimately admixed with a foodstuff in an amount sufficient to impart the desired intensity of flavor.

3. The process for the production of the edible foodstuff flavor composition of claim 1 which includes the further step of adding gum arabic to the poultry flavor and spray drying the resulting mixture, the weight ratio of gum arabic to said poultry flavored composition being from 0.2:1 up to 2:1 based on the solids content of the mixture prior to the spray drying.

4. A poulry flavored food comprising a product produced by the process of claim 3 intimately admixed with the foodstuff in an amount sufficient to impart the desired intensity of flavor.

* * * * *